Figure 1:
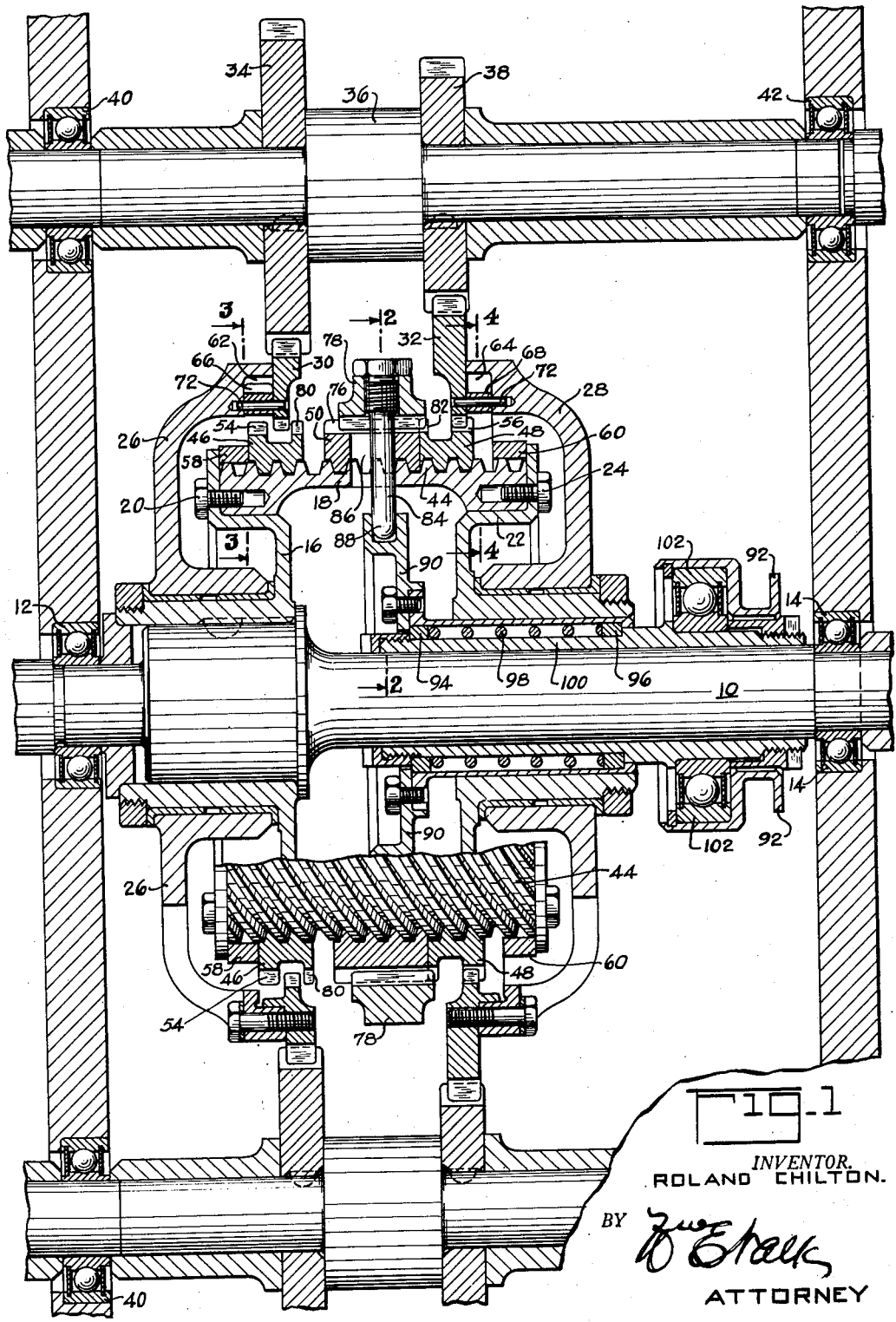

July 11, 1950 R. CHILTON 2,515,114
MULTIPLE INDIVIDUAL SCREW SHIFT CLUTCH RINGS
Filed Sept. 7, 1945 2 Sheets-Sheet 1

INVENTOR.
ROLAND CHILTON.
BY
ATTORNEY

July 11, 1950 R. CHILTON 2,515,114
MULTIPLE INDIVIDUAL SCREW SHIFT CLUTCH RINGS
Filed Sept. 7, 1945 2 Sheets-Sheet 2

INVENTOR.
ROLAND CHILTON
BY
ATTORNEY

Patented July 11, 1950

2,515,114

UNITED STATES PATENT OFFICE 2,515,114

MULTIPLE INDIVIDUAL SCREW SHIFT CLUTCH RINGS

Roland Chilton, Ridgewood, N. J., assignor to Wright Aeronautical Corporation, a corporation of New York Application September 7, 1945, Serial No. 614,914

15 Claims. (Cl. 192—48)

1

This invention relates to multi-speed transmissions and is particularly directed to a gear shift transmission in which the gear engaging members do not engage until they are in speed synchronism.

It is an object of this invention to provide a new and improved gear shift transmission in which a toothed clutch member is automatically shifted along helical splines into engagement with the gear to be engaged upon speed synchronism therewith. It is a further object of this invention to lock said clutch member against movement in either direction along its helical splines to provide a two-way drive—that is, one capable of transmitting forward and reverse torque.

Figure 2:
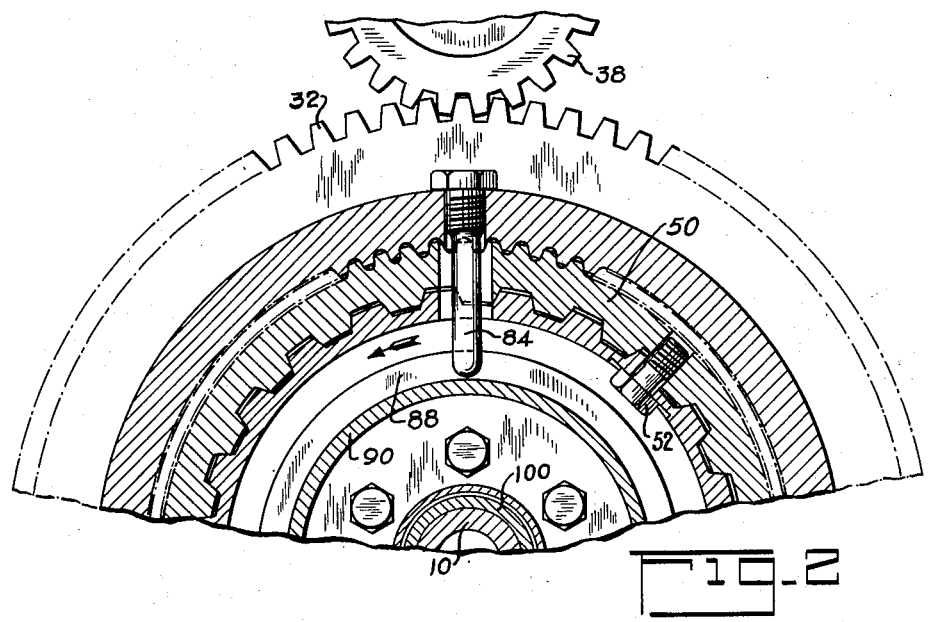
Figures 3, 4:
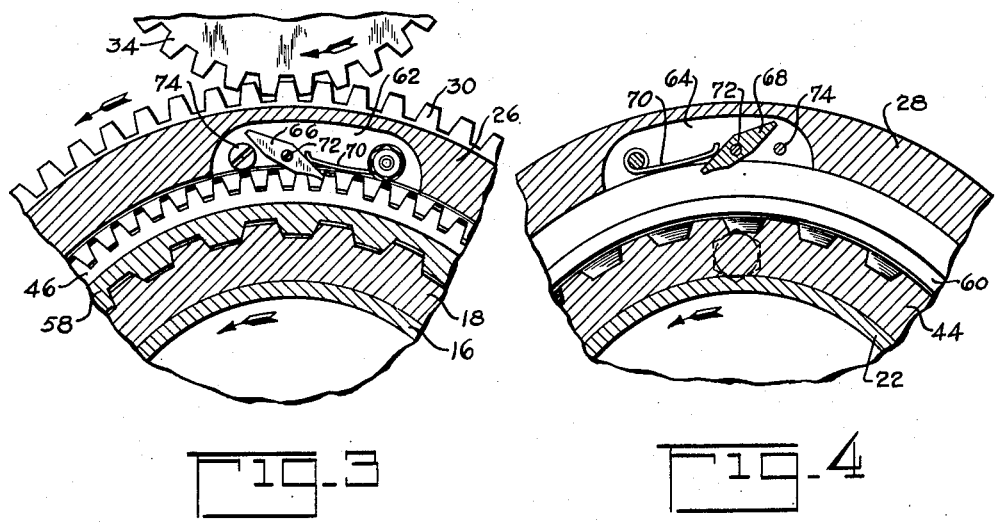

Other objects of this invention will become apparent upon reading the annexed detailed description in connection with the drawing in which:

Figure 1 is an axial section through a transmission model embodying the invention; and Figures 2, 3 and 4 are sectional views taken along lines 2—2, 3—3 and 4—4 of Figure 1.

Referring to the drawing, 10 designates an engine power shaft journaled in suitable bearings 12 and 14. Keyed to the driving shaft 10 is an end plate 16 which is secured to one end of a drum or shaft-like member 18 about the shaft 10 by screws 20. A second end plate 22 is secured to the other end of the drum 18 by screws 24. Gear carriers 26 and 28 are respectively journaled on hubs of the end plates 16 and 22 and annular gears 30 and 32 are secured to the carriers 26 and 28 respectively. The annular gear 30 is disposed in meshing engagement with a plurality of pinion gears 34 carried by circumferentially spaced layshafts 36. Similarly, the annular gear 32 is disposed in meshing engagement with a plurality of pinion gears 38 also carried by said layshafts. The layshafts 36 are journaled in bearings 40 and 42 and preferably are geared together to a driven or output shaft (not shown). The gears 32 and 38, when connected to the shaft 10, provide a relatively high speed-ratio drive to the layshafts 36 and the gears 30 and 34, when connected to the shaft 10, provide a relatively low speed-ratio drive to the shafts 36. Although a plurality of layshafts 36 have been illustrated, only one such layshaft is essential to the understanding or operation of the invention.

The drum 18 is provided with helical splines 44 upon which a pair of clutch rings 46 and 48 are mounted for screw-shift movement therealong. An annular abutment member or stop

2

50 is rigidly secured about the drum 18 between the clutch rings 46 and 48—for example, by screws 52 as illustrated in Figure 2. The ring 46 has clutch teeth 54 which are engageable with internal clutch teeth on the gear 30 when the ring 46 abuts the stop 50. Similarly, the ring 48 has clutch teeth 56 which are engageable with internal clutch teeth on the gear 32 when the ring 48 is against stop 50. The rings 46 and 48 can screw-shift along the helical splines between the central stop 50 and end stops 58 and 60 respectively, thereby engaging and disengaging the internal clutch teeth on the gears 30 and 32.

The gear carrier members 26 and 28 have a plurality of circumferentially spaced recesses 62 and 64, best seen in Figures 3 and 4, within which ratchets 66 and 68 are respectively supported. A spring 70, provided for each ratchet, serves to inwardly urge the working end of its associated ratchet about a pivot pin 72. In addition, stops 74 limit the reverse movement of the ratchets.

In operation, the gears 30 and 34 and the gears 32 and 38 are constantly in mesh so that the low speed-ratio gear 30 is always rotating at a higher speed than that of the high speed-ratio gear 32. With the drum 18 rotating in a counterclockwise direction as indicated by the arrows on Figures 2, 3 and 4 and with the helical splines 48 disposed as illustrated in Figure 1, the ratchets 66 on the gear 30 are pointed against this direction of rotation—that is clockwise in Figure 3—and the ratchets 68 are pointed in the opposite direction—that is counterclockwise in Figure 4. Also, the working ends of the ratchets 66 and 68 are each disposed in alinement with the remote side of one of the teeth on their associated gears. In this way, when the ratchets 66 engage clutch teeth 54, these teeth are then in alinement with the spaces between the internal clutch teeth on the gear 30 as illustrated in Figure 2. Similarly, when the ratchets 68 engage the clutch teeth 56 on the ring 48, the clutch teeth 56 are then in alinement with the spaces between the internal clutch teeth on the gear 32. With this arrangement, when the drum 18 rotates at a speed intermediate the speed of gears 30 and 32, both sets of ratchets 66 and 68 over-run the teeth of their associated clutch rings. When the drum 18 tends to over-run the gear 30, the ratchets 66 immediately engage clutch teeth 54 on the ring 46 to screw-shift the ring along the helical splines into meshing engagement with the internal clutch teeth of the gear 30 until the ring abuts the intermediate stop 50. Similarly, when the drum 18 tends to under-run the gear 32, the ratchets 68 immediately engage the teeth 56 on the clutch ring 48 to screw-shift this ring into meshing engagement with the internal clutch teeth of the gear 32 until the ring 48 abuts the stop 50.

With this construction, the drum or shaft-like member 18 may run at speeds intermediate the speeds of gears 30 and 32 but can never run at speeds outside this speed range because when the drum tends to rotate faster than the relatively fast rotating gear 30, the ratchets 66 immediately screw-shift the clutch ring 46 into engagement with the gear 30 thereby drivably connecting the drum 18 with the gear 30. Similarly, when the drum 18 tends to rotate at a speed below the relatively slow-moving gear 32, the ratchets 68 immediately screw-shift the clutch ring 48 into engagement with the gear 32 to drivably connect the drum 18 with the gear 32.

With the structure so far described, if the speed of the driving shaft 10 should be increased and decreased, the clutch rings 46 and 48 would be screw-shifted along the helical splines 44 into and out of engagement with their associated gears. In order to provide a positive two-way drive at both speed ratios, the intermediate stop member 50 is provided with external axial splines 76 along which a locking collar 78 is slidable. Also, the clutch rings 46 and 48 are provided with second sets of clutch teeth or splines 80 and 82 spaced from the first sets of clutch teeth 54 and 56 respectively and preferably disposed in alinement therewith, the clutch teeth or splines 80 and 82 having a profile similar to the profile of the splines 76. The arrangement is such that when the clutch rings are screw-shifted along the helical splines 44 into engagement with the stop 50, their second sets of clutch teeth are in alinement with the axial splines 76 on the stop 50. Accordingly, the locking collar 78 is then axially shiftable along the splines 76 so as to bring its axial splines into engagement with the second set of clutch teeth of the abutting clutch ring thereby locking the abutting clutch ring against screw-shift movement in either direction along its helical splines.

The locking collar 78 is provided with a plurality of radial pins 84 projecting inwardly through axially elongated slots 86 in the stop 50 and the drum 18. The pins 84 extend into an annular groove 88 in a shiftable disc 90. A shift control collar 92 is connected to the disc 90 by a two-way spring connection comprising a pair of washers 94 and 96 and a spring 98. The washers are urged away from each other against shoulders on the disc 90 and a sleeve 100 by the spring 98, the sleeve 100 being connected to the control collar 92 through a thrust bearing 102. In this way, shift movement of the control collar 92 compresses the spring 98 to urge the disc 90 and locking collar 78 through the same increment of shift movement. Means (not shown) is provided to shift the control collar 92 between its high speed-ratio position and its low speed-ratio position. As illustrated in Figure 1 the control collar is in its high speed-ratio position, in which the locking collar normally projects beyond the right end of the stop 50.

As illustrated in Figure 1, the transmission is in high speed ratio. To shift to low speed ratio, the control collar is shifted to the left to its low speed ratio position thereby moving the washer 96 to the left and compressing the spring 98. If there then happens to be an appreciable driving load between the locking collar 78 and the clutch teeth 82, the spring 98 will be unable to effect follow-up shift movement of the locking collar 78. Then, assuming the shaft 10 is driven by a conventional throttle-controlled internal combustion engine, the engine throttle is closed to remove the driving load. Thereupon, the spring 98 snaps the locking collar to the left into the path of movement of the clutch ring 46 thereby unlocking the clutch ring 48. The engine throttle is then restored to its open position, whereupon the drum 18 over-runs the relatively slow gear 32 and the clutch ring 48 shifts to the right out from engagement with the gear 32 and against the stop 60. When the drum 18 tends to over-run the relatively fast gear 30, the ratchets 66 engage the clutch teeth 54 to screw-shift the clutch ring 46 into engagement with the gear 30, whereby the clutch ring moves into engagement with the gear 30 upon speed snychronism therewith. At the same time, the clutch ring 46 pushes the locking collar 78 in front of it until it abuts the stop 50, whereupon the clutch teeth 80 are alined with the axial splines on the locking collar 78 and the spring 98 snaps the collar 78 to the left into engagement with the clutch teeth 80.

During normal or forward drive from the shaft 10 in low speed ratio, the torque on the clutch ring teeth 54 tends to shift the clutch ring 46 against the stop 50. Accordingly, the drive is taken through the abutting faces of the clutch ring 46 and stop 50 independently of the locking collar 78 so that there is no load on the teeth 80. However, if, while the drive is in low speed ratio, the driven or output shafts 36 drive the input shaft 10—for example, when the engine throttle is closed—then, the load on the clutch teeth 54 would tend to shift the clutch ring 46 to the left out from engagement with the gear 30, but this shift movement is prevented by the locking collar 78 which now takes the reverse drive through the clutch teeth 80.

To shift to high speed ratio, the control collar 92 is returned to its high speed-ratio position, illustrated in Figure 1, whereupon locking collar 78 snaps to the right into the path of movement of the clutch ring 48 thereby unlocking the clutch ring 46—that is, the locking collar snaps to the position illustrated in Figure 1. The engine throttle is then closed, whereupon the relatively fast gear 30 over-runs the drum 18 to screw-shift the clutch ring 46 to the left out from engagement with the gear 30 and against the stop 58. When the drum 18 tends to drop below the speed of the relatively slow-moving gear 32, the ratchets 68 screw-shift the clutch ring 48 to the left into engagement with the gear 32 so that the clutch ring 48 moves into engagement with the gear 32 upon speed synchronism therewith. At the same time, the clutch ring 48 pushes the locking collar in front of it until it abuts stop 50, whereupon the locking collar snaps to the right into engagement with the teeth 82, as illustrated in Figure 1. The engine throttle is then restored to its open position, whereupon the torque on the clutch teeth 56 tends to shift the clutch ring 48 out from engagement with the gear 32, but this is prevented by the engagement of the clutch teeth 82 with the axial splines on the locking collar 78. If the drive should reverse so that the output shafts 36 drive the input shaft 10 while the transmission is in high speed ratio, then the clutch ring 48 would be urged to the left against the stop 50 whereby the reverse drive is taken through the abutting faces of the clutch ring 48 and stop 50.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a multi-speed transmission, a shaft-like member having a set of helical splines, a pair of gear-engaging clutch members mounted for separate shift movement along said helical splines, and a single member adapted to lock said clutch members separately against shift movement along said splines.

2. In a multi-speed transmission, a shaft-like member having helical splines, a pair of gear-engaging clutch rings mounted for shift movement along said splines, and a collar shiftable along said member into engagement with one or the other of said rings for locking the engaged ring against shift movement along said helical splines.

3. In a multi-speed transmission, a shaft-like member having a first set of helical splines and a second set of splines inclined thereto, a pair of gear-engaging clutch rings mounted for shift movement along said helical splines, and a collar slidable along said second set of splines for locking one or the other of said rings against shift movement along said helical splines.

4. In a multi-speed transmission, a shaft-like member having a first set of helical splines, a pair of gear-engaging clutch rings mounted for shift movement along said helical splines, stop means rigid with said shaft-like member and disposed between said clutch rings, a set of splines on said stop means inclined to said helical splines, a collar slidable along said second-mentioned splines into locking engagement with either one of said clutch rings when said one clutch ring abuts said stop means.

5. In a multi-speed transmission, a shaft-like member having a set of helical splines, a pair of gear-engaging clutch rings mounted for shift movement along said splines, a stop member on said shaft-like member between said clutch rings, splines on said stop means inclined to said helical splines, and splines on each of said clutch rings disposed in alinement with the splines on said stop member when said clutch rings are disposed thereagainst, and a locking collar slidable along the splines on said stop member into engagement with the clutch ring splines disposed in alinement with said stop member splines.

6. In a multi-speed transmission, a pair of gears affording different speed ratios, a shaft-like member having a set of helical splines, a pair of clutch rings mounted for shift movement along said splines, and a locking member for said clutch rings, each of said clutch rings being shiftable into meshing engagement with one of said gears, said clutch rings and locking member having formations engageable when a clutch ring is in meshing engagement with its associated gear for locking said clutch ring against shift movement out from engagement with said gear.

7. In a multi-speed transmission, a pair of gears affording different speed ratios, a shaft-like member having a set of helical splines, a pair of clutch rings mounted for shift movement along said splines, stop means for limiting shift movement of said clutch rings, and locking means for said clutch rings, each of said clutch rings being shiftable into meshing engagement with one of said gears and simultaneously abutting said stop means, said clutch rings and locking means having formations engageable when a clutch ring abuts said stop means to lock said clutch ring against shift movement away from said stop means.

8. In a transmission, a gear, a shaft-like member having a set of helical splines, a toothed clutch member movable along said helical splines into and out of engagement with said gear, a locking member movable into the path of movement of said clutch member, cooperable formations on said clutch and locking members, said clutch member being effective, during its movement into engagement with said gear, to move said locking member out of its path of movement to aline said cooperable formations for locking engagement therebetween.

9. In a transmission, a gear, a shaft-like member having a set of helical splines, a toothed clutch member movable along said helical splines into and out of engagement with said gear, a locking member co-axial with said clutch member for locking said clutch member against movement along said splines, spring means for moving said locking member into the path of movement of said clutch member, said clutch member being effective to move said locking member out of said path of movement against said spring means when said clutch member moves into engagement with said gear, and cooperable formations on said clutch and locking members adapted to be alined when said engagement is effected to permit said spring means to move said locking member into locking engagement with said clutch member.

10. In a transmission, a gear, a shaft-like member having a set of helical splines and a second set of splines inclined thereto, a toothed clutch member movable along said helical splines into and out of engagement with said gear, a locking member movable along said second set of splines, spring means for moving said locking member into the path of movement of said clutch member, said clutch member being effective to move said locking member out of said path of movement against said spring means when said clutch member moves into engagement with said gear, and cooperable formations on said clutch and locking members adapted to be alined when said engagement is effected to permit said spring means to move said locking member into locking engagement with said clutch member.

11. In a transmission, a gear, a toothed clutch member movable into and out of engagement with said gear, a locking member, spring means for moving said locking member into the path of movement of said clutch member, said clutch member being effective to move said locking member out of said path of movement against said spring means when said clutch member moves into engagement with said gear, and cooperable formations on said clutch and locking members adapted to be alined when said engagement is effected to permit said spring means to move said locking member into locking engagement with said clutch member.

12. In a transmission, a gear, a shaft-like member having a set of helical splines, a toothed clutch member slidable along said splines into and out of engagement with said gear, a locking member rotatable with said shaft-like member and axially movable therealong, spring means for axially moving said locking member into the path of movement of said clutch member, said clutch member being effective to move said locking member out of said path of movement against said spring means when said clutch member moves into engagement with said gear, and cooperable formations on said clutch and locking members adapted to be alined when said engagement is effected to permit said spring means to move said locking member into locking engagement with said clutch member to prevent shift movement of said clutch member.

13. In a transmission, a gear, a shaft-like member having a set of helical splines, a toothed clutch member slidable along said splines into and out of engagement with said gear, a locking member rotatable with said shaft-like member and axially movable therealong, spring means for axially moving said locking member into the path of movement of said clutch member, said clutch member being effective to move said locking member out of said path of movement and against said spring means when said clutch member moves into engagement with said gear, and cooperable formations on said clutch and locking members adapted to be alined when said engagement is effected to permit said spring means to move said locking member into locking engagement with said clutch member to prevent shift movement of said clutch member, said cooperable formations comprising axial splines on said clutch and locking members.

14. In a transmission: a gear; a shaft-like member having a set of helical splines and a set of axial splines; a toothed clutch member having helical splines meshing with the helical splines on said shaft-like member for movement therealong into and out of engagement with said gear; a locking member having axial splines meshing with the axial splines on said shaft-like member for movement therealong; spring means for moving said locking member along its axial splines into the path of movement of said clutch member; said clutch member having axial splines adapted to abut the axial splines of said locking member to move said locking member against said spring means as said clutch member moves along its helical splines into engagement with said gear and, upon engagement with said gear, said axial splines become alined to permit said spring means to move said locking member into meshing engagement with the axial splines of said clutch member thereby preventing shift movement of said clutch member out from engagement with said gear.

15. In a multi-speed transmission, a shaft-like member having a set of helical splines, an abutment member on said shaft-like member intermediate the ends of said splines, a pair of toothed clutch members mounted for shift movement along said helical splines on opposite sides of said abutment member, a pair of gears each engageable by one of said clutch members, each of said clutch members being arranged for clutching engagement with its associated gear as said clutch member engages the adjacent side of said abutment member.

ROLAND CHILTON.

REFERENCES CITED

The following references are of record in the file of this patent:

UNITED STATES PATENTS

| Number | Name | Date |
| --- | --- | --- |
| 2,248,133 | Snow | July 8, 1941 |
| 2,248,134 | Snow | July 8, 1941 |
| 2,304,864 | Thompson | Dec. 15, 1942 |
| 2,384,439 | Carnagua et al. | Sept. 11, 1945 |
| 2,433,428 | Carnagua et al. | Dec. 30, 1947 |